United States Patent
Wang et al.

(10) Patent No.: US 10,954,322 B2
(45) Date of Patent: Mar. 23, 2021

(54) PREPOLYMER, METHOD OF PREPARING THE SAME, RESIN COMPOSITION AND ARTICLE MADE THEREFROM

(71) Applicant: Elite Electronic Material (Kunshan) Co., Ltd., Kunshan (CN)

(72) Inventors: Rongtao Wang, Kunshan (CN); Yan Zhang, Kunshan (CN); Bingbing Li, Kunshan (CN)

(73) Assignee: Elite Electronic Material (Kunshan) Co., Ltd., Kunshan (CN)

( * ) Notice: Subject to any disclaimer, the term of this patent is extended or adjusted under 35 U.S.C. 154(b) by 57 days.

(21) Appl. No.: 16/228,099

(22) Filed: Dec. 20, 2018

(65) Prior Publication Data

US 2020/0131286 A1 Apr. 30, 2020

(30) Foreign Application Priority Data

Oct. 31, 2018 (CN) .......................... 201811285813.4

(51) Int. Cl.

| C08F 12/34 | (2006.01) |
|---|---|
| C08K 5/3492 | (2006.01) |
| C08L 55/00 | (2006.01) |
| C08K 5/14 | (2006.01) |
| C08K 5/37 | (2006.01) |
| C08K 5/38 | (2006.01) |

(Continued)

(52) U.S. Cl.
CPC .............. *C08F 12/34* (2013.01); *C08F 16/32* (2013.01); *C08K 5/01* (2013.01); *C08K 5/06* (2013.01); *C08K 5/08* (2013.01); *C08K 5/13* (2013.01); *C08K 5/14* (2013.01); *C08K 5/18* (2013.01); *C08K 5/34924* (2013.01); *C08K 5/37* (2013.01); *C08K 5/38* (2013.01); *C08K 5/46* (2013.01); *C08L 55/005* (2013.01); *C08F 2500/01* (2013.01); *C08L 33/08* (2013.01); *C08L 63/00* (2013.01); *C08L 67/00* (2013.01); *C08L 71/12* (2013.01); *C08L 79/08* (2013.01); *C08L 2203/16* (2013.01); *C08L 2203/20* (2013.01)

(58) Field of Classification Search
None
See application file for complete search history.

(56) References Cited

U.S. PATENT DOCUMENTS

| 6,063,839 A * | 5/2000 | Oosedo ...................... C08J 5/24 523/206 |
| 8,277,924 B2 * | 10/2012 | Imaizumi .............. B29C 45/062 428/156 |

(Continued)

OTHER PUBLICATIONS

Principles of polymerization, George Odian, 3rd ed. 1991, pp. 250-254. (Year: 1991).*

*Primary Examiner* — Satya B Sastri
(74) *Attorney, Agent, or Firm* — Muncy, Geissler, Olds & Lowe, P.C.

(57) ABSTRACT

A prepolymer, which is prepared by subjecting an unsaturated bond-containing compound and a bis(vinylphenyl) compound monomer or a polymer thereof to a prepolymerization reaction, is provided. The bis(vinylphenyl) compound contains between 80% and 99% of para-para vinyl groups and has a monomer content of between 80% and 100%. Moreover, a resin composition comprising the prepolymer and an additive, a method of preparing the prepolymer, and an article made from the resin composition are also provided.

24 Claims, 3 Drawing Sheets (51) Int. Cl.
| | |
|---|---|
| *C08K 5/01* | (2006.01) |
| *C08K 5/06* | (2006.01) |
| *C08K 5/08* | (2006.01) |
| *C08K 5/13* | (2006.01) |
| *C08K 5/18* | (2006.01) |
| *C08K 5/46* | (2006.01) |
| *C08F 16/32* | (2006.01) |
| *C08L 71/12* | (2006.01) |
| *C08L 63/00* | (2006.01) |
| *C08L 67/00* | (2006.01) |
| *C08L 33/08* | (2006.01) |
| *C08L 79/08* | (2006.01) |

(56) References Cited

U.S. PATENT DOCUMENTS 10,889,672 B2 * 1/2021 Zhang .................. C08F 261/06
2009/0292050 A1 * 11/2009 He .......................... C08K 3/36
524/404

\* cited by examiner

PREPOLYMER, METHOD OF PREPARING THE SAME, RESIN COMPOSITION AND ARTICLE MADE THEREFROM

CROSS-REFERENCE TO RELATED APPLICATION

This application claims the priority benefits of China Patent Application No. 201811285813.4, filed on Oct. 31, 2018, the entirety of which is hereby incorporated by reference herein and made as a part of this specification.

BACKGROUND

1. Field of the Disclosure

The present disclosure pertains to the technical field of polymer materials and more particularly to a prepolymer, a preparation method thereof, a resin composition comprising the prepolymer, and an article made therefrom.

2. Description of Related Art

With the rapid evolution of electronic technology, data processing of electronic products including mobile communication apparatuses, servers and mainframe computers has been continuously developed towards high frequency signal transmission and high speed digitalization, and low dielectric materials have therefore become the mainstream for the development of laminates with a high transmission rate so as to meet the demands of high speed data processing.

Conventionally, polyphenylene oxide resins are widely used for making low dielectric copper-clad laminates, but copper-clad laminates made solely from a polyphenylene oxide resin have a low glass transition temperature, and polyphenylene oxide resin has poor compatibility with other resins, which causes the problems of high ratio of thermal expansion and poor thermal resistance, thereby failing to meet the demands of new generation high frequency and low dielectric circuit boards.

Bismaleimide has been introduced to improve the resin properties to achieve low ratio of thermal expansion and high thermal resistance of the resin system, but this solution will result in deterioration of the dielectric properties. On the other hand, bis(vinylphenyl) ethane has also been introduced to improve the properties of a resin system, but bis(vinylphenyl) ethane may crystallize easily due to its symmetric structure and has poor solubility and therefore unsatisfactory varnish shelf life, such that its application in laminates is limited.

Accordingly, there is a need to develop a material for copper-clad laminates that overcomes at least one of the aforesaid technical problems.

SUMMARY

To address the drawbacks of prior arts, the present disclosure provides a prepolymer, a preparation method thereof, a resin composition comprising the prepolymer, and an article made therefrom, characterized by including at least one of the following properties: long varnish shelf life, low dielectric constant (Dk), low dissipation factor (Df), high glass transition temperature (Tg), low water absorption rate, low ratio of thermal expansion, excellent thermal resistance, excellent thermal resistance after moisture absorption, etc.

Inventors of the present application, after repeated research and investigation, unexpectedly found that by subjecting an unsaturated bond-containing compound and a bis(vinylphenyl) compound monomer or a polymer thereof to a prepolymerization reaction, the problems of the bis (vinylphenyl) compound such as unsatisfactory varnish shelf life due to high crystallizability can be alleviated, and in the mean time at least one of stickiness resistance, thermal resistance and thermal resistance after moisture absorption of articles made therefrom may be improved. In addition, by controlling the monomer content and the content of para-para vinyl groups of the bis(vinylphenyl) compound, it is possible to use a resin composition containing the prepolymer to make articles including at least one of the following desirable properties: low dielectric constant (Dk), low dissipation factor (Df), high glass transition temperature (Tg), low water absorption rate, low ratio of thermal expansion, excellent thermal resistance, excellent thermal resistance after moisture absorption, etc.

It is a primary object of the present disclosure to provide a prepolymer prepared by subjecting an unsaturated bond-containing compound and a bis(vinylphenyl) compound monomer of Formula (I) or a polymer thereof to a prepolymerization reaction, Formula (I)

wherein R represents any one of Formula (II) to Formula (IV):

Formula (II)

Formula (III)

Formula (IV)

wherein n1 represents an integer of 0 to 30 (e.g., 0, 5, 10, 15, 20, 25 or 30), n2 represents an integer of 0 to 6, n3, n4, n5, n6 and n7 individually represent an integer of 1 to 6, the bis(vinylphenyl) compound contains between 80% and 99% of para-para vinyl groups and has a monomer content of between 80% and 100%.

Preferably, the bis(vinylphenyl) compound comprises bis (vinylphenyl) ethane, bis(vinylphenyl) dimethylbenzene, bis (vinylphenyl) dimethyl ether, and/or bis(vinylphenyl) diethylbenzene.

More preferably, the bis(vinylphenyl) compound comprises bis(vinylphenyl) ethane (BVPE).

The bis(vinylphenyl) ethane may comprise any one or more isomers, such as p,p-divinyl-1,2-diphenylethane (p,p-BVPE, having a structure as shown in Formula (V)), m,p-divinyl-1,2-diphenylethane (m,p-BVPE, having a structure as shown in Formula (VI)) and m,m-divinyl-1,2-diphenylethane (m,m-BVPE, having a structure as shown in Formula (VII)). As used herein, p represents para-position and m represents meta-position. According to the present disclosure, the bis(vinylphenyl) compound used in the prepolymerization reaction, such as bis(vinylphenyl) ethane, contains between 80% and 99% of para-para vinyl groups. In other words, in 80% to 99% of the bis(vinylphenyl) ethane, the vinyl groups on the vinylphenyl groups are both at the para-position of the benzene rings relative to the R group bonded with the vinylphenyl groups; some examples of the bis(vinylphenyl) ethane are as shown below:

Formula (V)

;

Formula (VI)

;

Formula (VII)

.

In addition, according to the present disclosure, the unsaturated bond-containing compound may be prepolymerized with the bis(vinylphenyl) compound monomer of Formula (I) or with a polymer of the bis(vinylphenyl) compound of Formula (I), wherein the polymer may comprise, but not limited to, a dimer or a trimer of the bis(vinylphenyl) compound or its isomer. However, unless otherwise specified, the bis(vinylphenyl) compound used in the prepolymerization reaction has a monomer content of between 80% and 100%. In other words, the prepolymer of the present disclosure is prepared by subjecting an unsaturated bond-containing compound and a bis(vinylphenyl) compound containing 80% to 100% of the monomer.

Unless otherwise specified, according to the present disclosure, but not limited to, a prepolymer refers to a product with an intermediate molecular weight obtained by subjecting a monomer to a certain degree of reaction, the intermediate molecular weight being greater than the molecular weight of the monomer before reaction but less than the molecular weight of the final polymer obtained from a complete reaction; in addition, the prepolymer contains a reactive functional group capable of participating further polymerization to obtain the final polymer product which has been fully crosslinked or cured. According to the present disclosure, prepolymerization reaction refers to the process of reacting one, two or more monomers to obtain a prepolymer. Monomer refers to a compound which may participate polymerization or prepolymerization reaction to produce a high molecular weight compound.

The prepolymerization reaction of the bis(vinylphenyl) compound according to the present disclosure refers to a conversion rate of the bis(vinylphenyl) compound which is in a range of greater than 0% and less than 100% (exclusive of 0% and 100%). Existence of some unpolymerized (e.g., not converted) vinyl-containing compounds may increase the compatibility and crosslinking degree of the prepolymerized resin in the resin composition. Specifically, a 0% conversion rate of the bis(vinylphenyl) compound represents no reaction of the vinyl-containing compound and therefore no product formation from the prepolymerization reaction of the bis(vinylphenyl) compound and other compound. Similarly, a 100% conversion rate of the bis(vinylphenyl) compound represents complete reaction of the bis(vinylphenyl) compound and therefore no product formation from the prepolymerization reaction of the bis(vinylphenyl) compound and other compound.

Unless otherwise specified, according to the present disclosure, a compound refers to a chemical substance formed by two or more elements bonded with chemical bonds and may be present as a monomer, a polymer, etc., but not limited thereto. A polymer refers to a chemical substance formed by one, two or more compounds via polymerization and may comprise a homopolymer, a copolymer, etc., but not limited thereto. As used herein, the term "polymer" includes but is not limited to an oligomer. An oligomer refers to a polymer with 2-20, typically 2-5, repeating units.

Generally, a prepolymer refers to a chemical substance formed by one, two or more compounds via prepolymerization. As used herein, a prepolymer refers to a chemical substance formed by two or more compounds via prepolymerization.

The unsaturated bond-containing compound described herein comprises one or more unsaturated bonds per molecule. Unless otherwise specified, the unsaturated bond of the unsaturated bond-containing compound is a reactive unsaturated bond, such as but not limited to a double bond with the potential of being crosslinked with other functional groups, such as an unsaturated carbon-carbon double bond with the potential of being crosslinked with other functional groups, but not limited thereto.

In one embodiment, the unsaturated bond-containing compound comprises acrylate, styrene, t-butyl styrene, divinylbenzene, triallyl isocyanurate, triallyl cyanurate, 1,2,4-trivinyl cyclohexane, polyphenylene oxide, cyanate ester, maleimide resin or a combination thereof. Unless otherwise specified, according to the present disclosure, the unsaturated bond-containing compound, such as acrylate, styrene, t-butyl styrene, divinylbenzene, triallyl isocyanurate, triallyl cyanurate, 1,2,4-trivinyl cyclohexane, polyphenylene oxide, cyanate ester or maleimide resin, should be construed as encompassing its modification.

Examples of the modification described above may comprise, but not limited to, a product derived from an unsaturated bond-containing compound with its reactive functional group modified, a product from a prepolymerization reaction of an unsaturated bond-containing compound and other compound(s), a product from a crosslinking reaction of an unsaturated bond-containing compound and other compound(s), a product from homopolymerizing an unsaturated bond-containing compound, a product from copolymerizing an unsaturated bond-containing compound and another different unsaturated bond-containing compound, etc.

In one embodiment, the prepolymer disclosed herein is prepared by subjecting an unsaturated bond-containing compound and a bis(vinylphenyl) compound monomer of Formula (I) or a polymer thereof to a prepolymerization reaction in the presence of a peroxide. Examples of the peroxide include, but not limited to, benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis(4-t-butylcyclohexyl) peroxydicarbonate or a combination thereof.

Preferably, the peroxide comprises benzoyl peroxide, dicumyl peroxide or a combination thereof.

In one embodiment, the prepolymer disclosed herein is prepared by subjecting an unsaturated bond-containing compound and a bis(vinylphenyl) compound monomer of Formula (I) or a polymer thereof to a prepolymerization reaction in the presence of a molecular weight regulator. For example, the molecular weight regulator may be a chain transfer agent. Examples of the molecular weight regulator include, but not limited to, n-butyl mercaptan, dodecyl mercaptan, mercaptoacetic acid, mercaptopropanoic acid, mercaptoethanol, 2,4-diphenyl-4-methyl-1-pentene or a combination thereof.

Preferably, the molecular weight regulator comprises n-butyl mercaptan, 2,4-diphenyl-4-methyl-1-pentene or a combination thereof.

In one embodiment, the prepolymer disclosed herein is prepared by subjecting an unsaturated bond-containing compound and a bis(vinylphenyl) compound monomer of Formula (I) or a polymer thereof to a prepolymerization reaction in the presence of a polymerization inhibitor. For example, the polymerization inhibitor may comprise hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof, but not limited thereto.

Preferably, the polymerization inhibitor comprises hydroquinone, 4-t-butylcatechol or a combination thereof.

To enable the reactants, i.e., the unsaturated bond-containing compound and the bis(vinylphenyl) compound, to undergo a prespecified degree of reaction to form the prepolymer with an intermediate molecular weight, the conversion rate of the prepolymerization reaction needs to be controlled in a range of greater than 0% and less than 100%, such as between 10% and 90% or between 30% and 80%, such as about 10%, 20%, 30%, 40%, 50%, 60%, 70%, 80% or 90%. Generally speaking, the following problems may appear if the conversion rate is too high: the prepolymerized product will have high gelation tendency, which causes poor shelf life of the prepolymerized product or difficulty of dissolution during prepolymerization; the prepolymerized product will have excessively high weight average molecular weight, which causes poor compatibility of the prepolymerized product in the resin composition and poor flowability and poor appearance of products made therefrom, such as prepregs; and insufficient amount of remaining monomer of the bis(vinylphenyl) compound, which leads to insufficient reactive functional groups for crosslinking in the resin composition and therefore the glass transition temperature of the products is not high. On the other hand, the following problems may appear if the conversion rate is too low: the prepolymerized product will contain a large amount of monomer of the bis(vinylphenyl) compound which may easily crystallize and precipitate and cause poor shelf life of the prepolymerized product; the bis(vinylphenyl) compound may easily crystallize and precipitate when further preparing the resin composition; and products such as prepregs will have poor appearance as a result of removal of solvent from the resin composition which causes precipitation of the bis(vinylphenyl) compound during the baking process.

In one embodiment, the prepolymer according to the present disclosure contains residual reactive vinyl groups after the prepolymerization reaction of the reactants and therefore has the potential of crosslinking in a resin composition with other components.

Unless otherwise specified, the conversion rate described herein refers to the value calculated by dividing the decreased integral area of the characteristic peak of the bis(vinylphenyl) compound GPC curve after the prepolymerization reaction by the integral area of the characteristic peak of the bis(vinylphenyl) compound in the mixture prior to the prepolymerization reaction, then multiplied by 100%.

In one embodiment, the prepolymer according to the present disclosure has a weight average molecular weight of about 1000 to 200000, preferably 2000 to 100000, such as 4000 to 20000 or 4000 to 8000. In general, if the weight average molecular weight of the prepolymer is too high, it will have poor compatibility in the resin composition and therefore result in poor flowability and poor appearance of products such as prepregs.

One of the features of the present disclosure is to, under proper conditions, control the reaction conversion rate of the bis(vinylphenyl) compound and the unsaturated bond-containing compound and the molecular weight of the prepolymer obtained therefrom. For example, during the prepolymerization reaction, the aforesaid peroxide, molecular weight regulator (e.g., chain transfer agent), polymerization inhibitor or a combination thereof is used to control the reaction conversion rate of the bis(vinylphenyl) compound and the unsaturated bond-containing compound and the weight average molecular weight of the prepolymer obtained therefrom, such that the components are partially reacted and the product may retain residual vinyl groups (i.e., unreacted vinyl groups). For example, during the prepolymerization, the conversion rate of the bis(vinylphenyl) compound may be between 10% and 90%, preferably between 30% and 80%. Specifically, a 0% conversion rate of the bis(vinylphenyl) compound represents no reaction of the bis(vinylphenyl) compound and therefore fails to form the prepolymer of the present disclosure. Similarly, a 100% conversion rate of the bis(vinylphenyl) compound represents complete reaction of the bis(vinylphenyl) compound and therefore fails to form the prepolymer of the present disclosure, and the product thus obtained will not contain a reactive vinyl group.

In another embodiment of the present disclosure, the prepolymer is prepared by subjecting a bis(vinylphenyl) compound, a first unsaturated bond-containing compound and a second unsaturated bond-containing compound to a prepolymerization reaction, wherein the first unsaturated bond-containing compound and the second unsaturated bond-containing compound are different, and the prepolymerized product contains reactive vinyl groups. In other words, according to the present disclosure, one, two or more unsaturated bond-containing compounds may participate the prepolymerization reaction. In addition, unless otherwise specified, in the prepolymerization reaction of an unsaturated bond-containing compound and a bis(vinylphenyl) compound monomer of Formula (I) or a polymer thereof, other components may be added or used to participate the prepolymerization reaction.

The first unsaturated bond-containing compound comprises one or more unsaturated bonds per molecule. For example, the first unsaturated bond-containing compound may comprise acrylate, styrene, t-butyl styrene, divinylbenzene, triallyl isocyanurate, triallyl cyanurate, 1,2,4-trivinyl cyclohexane, polyphenylene oxide, cyanate ester, maleimide resin or a combination thereof. Unless otherwise specified, according to the present disclosure, the first unsaturated bond-containing compound may also be a modification of the aforesaid components.

On the other hand, the second unsaturated bond-containing compound comprises one or more unsaturated bonds per molecule, and the first unsaturated bond-containing compound and the second unsaturated bond-containing compound have different structures. For example, the second unsaturated bond-containing compound may comprise acrylate, styrene, t-butyl styrene, divinylbenzene, triallyl isocyanurate, triallyl cyanurate, 1,2,4-trivinyl cyclohexane, polyphenylene oxide, cyanate ester, maleimide resin or a combination thereof. Unless otherwise specified, according to the present disclosure, the second unsaturated bond-containing compound may also be a modification of the aforesaid components.

The present disclosure further discloses a method of preparing the prepolymer, comprising subjecting the unsaturated bond-containing compound and the bis(vinylphenyl) compound monomer of Formula (I) or a polymer thereof to a prepolymerization reaction. In one embodiment, to more precisely control the conversion rate of the prepolymerization reaction, a peroxide, a molecular weight regulator, a polymerization inhibitor or a combination thereof may be used, such as but not limited to prior to the prepolymerization reaction, during the prepolymerization reaction or after the prepolymerization reaction.

For example, the peroxide may include, but not limited to, benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, di(t-butylperoxy) isophthalate, t-butyl peroxybenzoate, 2,2-di(t-butylperoxy) butane, 2,2-di(t-butylperoxy)octane, 2,5-dimethyl-2,5-di (benzoylperoxy)hexane, lauroyl peroxide, t-hexyl peroxypivalate, dibutylperoxyisopropylbenzene, bis(4-t-butylcyclohexyl) peroxydicarbonate or a combination thereof. Relative to a total of 100 parts by weight of the bis (vinylphenyl) compound and the unsaturated bond-containing compound (which may refer to such as comprising a total of 100 parts by weight of the bis(vinylphenyl) compound, the first unsaturated bond-containing compound and the second unsaturated bond-containing compound), the peroxide may be used by an amount of 0.001 to 5 parts by weight, preferably 0.1 to 1 part by weight.

For example, the molecular weight regulator may include, but not limited to, n-butyl mercaptan, dodecyl mercaptan, mercaptoacetic acid, mercaptopropanoic acid, mercaptoethanol, 2,4-diphenyl-4-methyl-1-pentene or a combination thereof. Relative to a total of 100 parts by weight of the bis(vinylphenyl) compound and the unsaturated bond-containing compound, the molecular weight regulator may be used by an amount of 0.001 to 1 part by weight, preferably 0.005 to 0.8 part by weight.

For example, the polymerization inhibitor may comprise hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof, but not limited thereto. In the present disclosure, the use amount of the polymerization inhibitor is not particularly limited; relative to 100 parts by weight of the bis(vinylphenyl) compound and the unsaturated bond-containing compound, the polymerization inhibitor may be used by an amount of 0.001 to 1 part by weight, preferably 0.005 to 0.8 part by weight.

For example, any one or a combination of a bis(vinylphenyl) compound, an unsaturated bond-containing compound, a peroxide, a polymerization inhibitor, and a molecular weight regulator may be dissolved in a solvent, wherein continuously stirring may be required to facilitate complete dissolution if the bis(vinylphenyl) compound, the unsaturated bond-containing compound, the peroxide, the polymerization inhibitor, or the molecular weight regulator is in a solid state. Next, the reaction temperature is increased to above room temperature, such as between 40° C. and 140° C., preferably 70-100° C., and the reaction is continuously stirred for 0.5-6 hours, preferably 1-4 hours. Next, the temperature is lowered to room temperature (about 25° C.) to obtain a solution, which is filtered to remove impurities to obtain a reaction product, i.e., the prepolymer formed by reacting the bis(vinylphenyl) compound and the unsaturated bond-containing compound.

In one embodiment of the present disclosure, the method of preparing the prepolymer comprises dissolving any one or a combination of a bis(vinylphenyl) compound, a first unsaturated bond-containing compound, a peroxide, a polymerization inhibitor, and a molecular weight regulator in a solvent, followed by adding a second unsaturated bond-containing compound, wherein continuously stirring may be required to facilitate complete dissolution if the bis(vinylphenyl) compound, the first unsaturated bond-containing compound, the second unsaturated bond-containing compound, the peroxide, the polymerization inhibitor, or the molecular weight regulator is in a solid state. Next, the reaction temperature is increased to above room temperature, such as 50-130° C., preferably 70-100° C., and the reaction is continuously stirred for 0.5-6 hours, preferably 1-4 hours, and then the temperature is reduced to room temperature (about 25° C.) to obtain a solution, which is filtered to remove impurities to obtain a prepolymerized product, i.e., the prepolymer formed by the prepolymerization reaction of the bis(vinylphenyl) compound, the first unsaturated bond-containing compound, and the second unsaturated bond-containing compound.

The present disclosure further discloses a resin composition comprising the aforesaid prepolymer and an additive.

In one embodiment, the resin composition comprises 1 to 300 parts by weight of the additive relative to 100 parts by weight of the prepolymer. The type of the additive is not particularly limited, which may be any one or more compounds capable of being crosslinked with the prepolymer.

In one embodiments, the additive may comprise polyphenylene oxide, cyanate ester, maleimide resin, polyolefin, acrylate, styrene, t-butyl styrene, divinylbenzene, bis(vinylbenzyl) ether, bis(vinylphenyl) ethane, triallyl isocyanurate, triallyl cyanurate, 1,2,4-trivinyl cyclohexane or a combination thereof. In addition, unless otherwise specified, the aforesaid polyphenylene oxide, cyanate ester, maleimide resin, polyolefin, acrylate, styrene, t-butyl styrene, divinylbenzene, bis(vinylbenzyl) ether, bis(vinylphenyl) ethane, triallyl isocyanurate, triallyl cyanurate, and 1,2,4-trivinyl cyclohexane shall be construed as including the modifications thereof.

Examples of the modification described above may comprise, but not limited to, a product derived from an unsaturated bond-containing compound with its reactive functional group modified, a product from a prepolymerization reaction of an unsaturated bond-containing compound and other compound(s), a product from a crosslinking reaction of an unsaturated bond-containing compound and other compound(s), a product from homopolymerizing an unsaturated bond-containing compound, a product from copolymerizing an unsaturated bond-containing compound and another different unsaturated bond-containing compound, etc.

In one embodiment of the present disclosure, relative to 100 parts by weight of the prepolymer, the content of each additive or combination thereof may be 1 to 200 parts by weight, preferably 5 to 100 parts by weight, such as 5, 10, 15, 20, 30, 40, 50, 60, 70, 80, 90 or 100 parts by weight. The additive is preferably a polyphenylene oxide and/or a modification thereof, a maleimide resin and/or a modification thereof, or a polyolefin and/or a modification thereof.

Modifications of additives suitable for the resin composition of the present disclosure preferably refers to products derived from additives whose hydrogen atom or group is substituted by other atom or group. For example, halogen-substituted hydrocarbon, alcohol, aldehyde, and carboxylic acid may be considered as derivatives of hydrocarbon as they are products of hydrocarbon group with its hydrogen atom substituted by halogen, hydroxyl group, oxygen, etc.

In one embodiment of the present disclosure, the resin composition may optionally further comprise epoxy resin, phenoxy resin, benzoxazine resin, styrene maleic anhydride, acrylic resin, polyester, amine curing agent, diallyl bisphenol A, polyamide, polyimide or a combination thereof. Unless otherwise specified, relative to a total of 100 parts by weight of the prepolymer and the additive, the content of the aforesaid component may be 1 to 200 parts by weight, such as 5, 10, 20, 30, 40, 50, 60, 70, 80, 90, 100, 150 or 200 parts by weight.

In one embodiment of the present disclosure, the resin composition may optionally further comprise flame retardant, inorganic filler, curing accelerator, solvent, molecular weight regulator, polymerization inhibitor, toughening agent, coupling agent or a combination thereof Unless otherwise specified, relative to a total of 100 parts by weight of the prepolymer and the additive, the content of the aforesaid component may be 1 to 200 parts by weight, such as 5, 10, 20, 30, 40, 50, 60, 70, 80, 90, 100, 150 or 200 parts by weight.

In one embodiment, the bis(vinylphenyl) compound and the unsaturated bond-containing compound are prepolymerized according to a weight ratio of 9.9:0.1 to 0.1:9.9. Preferably, the weight ratio of the bis(vinylphenyl) compound and the unsaturated bond-containing compound may be for example 9:1, 8:2, 7:3, 6:4, 5.5:4.5, 5:5, 4.5:5.5, 4:6, 3:7, 2:8 or 1:9, but not limited thereto. For example, the weight ratio of the bis(vinylphenyl) compound and the unsaturated bond-containing compound may also be 7.5:2.5. More preferably, the weight ratio of the bis(vinylphenyl) compound and the unsaturated bond-containing compound may be for example 2:8, 3:7, 4:6, 4.5:5.5, 5:5, 5.5:4.5, 6:4, 7:3 or 8:2.

In one embodiment, the bis(vinylphenyl) compound, the first unsaturated bond-containing compound and the second unsaturated bond-containing compound are prepolymerized according to a weight ratio of 9.9:0.1:0.1 to 0.1:9.9:9.9. In one embodiment, the first unsaturated bond-containing compound and the second unsaturated bond-containing compound are prepolymerized according to a weight ratio of 9.9:0.1 to 0.1:9.9.

In one embodiment, the prepolymer preparation method disclosed herein uses a reaction temperature of 50-90° C., such as but not limited to 50° C., 52° C., 55° C., 56° C., 58° C., 60° C., 62° C., 65° C., 68° C., 70° C., 72° C., 74° C., 75° C., 78° C., 80° C., 82° C., 85° C., 88° C. or 90° C., and any specific point value between the aforesaid values. For the purpose of brevity and conciseness, not all specific point values are described and listed exhaustively herein.

In one embodiment, the prepolymer preparation method disclosed herein uses a reaction time of 0.5 hour to 4 hours, such as but not limited to 0.5 hour, 1 hour, 1.5 hours, 2 hours, 2.5 hours, 3 hours, 3.5 hours or 4 hours, and any specific point value between the aforesaid values. For the purpose of brevity and conciseness, not all specific point values are described and listed exhaustively herein.

The article made from the resin composition disclosed herein may comprise a resin film, a prepreg, a laminate or a printed circuit board.

The article made from the resin composition may be a resin film which is prepared by heating and baking the resin composition to the semi-cured state (B-stage). The resin composition may be selectively coated on a polyethylene terephthalate film (PET film), a polyimide film (PI film), or a liquid crystal resin film, followed by heating and baking to semi-cure the resin composition to convert the resin composition into a resin film. The resin composition may also be coated on a copper foil, followed by baking and heating to the semi-cured state to obtain a resin-coated copper (RCC), also known as a resin film with copper foil.

The article made from the resin composition may be a prepreg, which comprises a reinforcement material and a layered structure disposed thereon. The layered structure is formed by heating the resin composition at a high temperature to the B-stage. Suitable baking temperature for making the prepreg may be 80° C. to 170° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal resin woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

The article made from the resin composition may be a laminate, which comprises two metal foils and an insulation layer disposed between the metal foils, wherein the insulation layer is made by curing the aforesaid prepreg or resin film at high temperature and high pressure to the C-stage, a suitable curing temperature being for example between 150° C. and 220° C. and preferably between 190° C. and 210° C. and a suitable curing time being 90 to 200 minutes and preferably 120 to 180 minutes. The metal foil may comprise copper, aluminum, nickel, platinum, silver, gold or alloy thereof, such as a copper foil.

Preferably, the laminate is a copper-clad laminate (CCL).

The laminate may be further processed by trace formation processes to provide a printed circuit board.

The articles made from the resin composition disclosed herein may have at least one, preferably at least two, more or all, of the following properties:

a glass transition temperature as measured by using a dynamic mechanical analyzer by reference to IPC-TM- 650 2.4.24.4 of greater than or equal to 216° C., such as between 216° C. and 240° C. or between 220° C. and 230° C.;
a ratio of thermal expansion in Z-axis as measured by using a thermomechanical analyzer by reference to IPC-TM-650 2.4.24.5 of less than or equal to 2.70%, such as between 2.20% and 2.70%;
a copper foil peeling strength as measured by using a tensile strength tester by reference to IPC-TM-650 2.4.8 of greater than or equal to 3.0 lb/in, such as between 3.0 lb/in and 3.8 lb/in;
no delamination occurrence after moisture absorption of 5 hours as measured by reference to IPC-TM-650 2.6.16.1 and then subject to a solder dip test by reference to IPC-TM-650 2.4.23;
a dissipation factor as measured by reference to JIS C2565 of less than or equal to 0.0020, such as between 0.0005 and 0.0020, or between 0.0010 and 0.0020, or between 0.0015 and 0.0020;
a dielectric constant as measured by reference to JIS C2565 of less than or equal to 3.10, such as between 2.50 and 3.10, or between 3.05 and 3.10;
good stickiness resistance (no stickiness between prepregs) as measured from a plurality of prepregs vacuum-packed by an aluminium foil bag for storage at 35° C. constant temperature for 48 hours and then inspected visually to determine stickiness of the prepregs; and a shelf life of varnish made from the resin composition of greater than or equal to 1 day (no precipitation, turbidity or layer separation after 1 day), such as greater than or equal to 2, 3, 5, 7, 9, 11 or 15 days, as measured from a varnish made from the resin composition standing still at 5-35° C. and visually inspected for precipitation, turbidity or layer separation.

Methods for measuring the aforesaid properties will be elaborated in detail below.

DETAILED DESCRIPTION OF EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features such as values, numbers, contents, amounts or concentrations presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Examples and embodiments are described in detail below. It will be understood that these examples and embodiments are exemplary only and are not intended to limit the scope of the present disclosure. Unless otherwise specified, processes, reagents and conditions described in the examples are those known in the art.

Disclosed is a prepolymer prepared by subjecting a composition, which comprises, but not limited to, an unsaturated bond-containing compound and a bis(vinylphenyl) compound monomer of Formula (I) or a polymer thereof, to a prepolymerization reaction:

Formula (I)

wherein R represents any one of Formula (II) to Formula (IV):

Formula (II)

Formula (III)

Formula (IV)

wherein n1 represents an integer of 0 to 30, n2 represents an integer of 0 to 6, n3, n4, n5, n6 and n7 individually represent an integer of 1 to 6, the bis(vinylphenyl) compound contains between 80% and 99% of para-para vinyl groups and has a monomer content of between 80% and 100%.

Preferably, n1 represents an integer of 0 to 6, such as but not limited to 0, 1, 2, 3, 4, 5 or 6.

Preferably, n2 represents 0 or 1.

Preferably, n3 through n7 are all 1.

In one embodiment, the composition further comprises a methacrylate-terminated polyphenylene oxide resin.

Also disclosed herein is a method of preparing the prepolymer, in which the composition is subject to a prepolymerization reaction under proper conditions so that the product thus prepared contains residual reactive vinyl group, and the conversion rate of the bis(vinylphenyl) compound and the molecular weight of the prepolymer are both under control. Preferably, the conversion rate of the bis(vinylphenyl) compound is 30% to 80%, and the weight average molecular weight of the prepolymer is 2,000 to 100,000.

Also disclosed herein is a resin composition, comprising the above-described prepolymer and an additive.

Also disclosed herein is an article made from the resin composition, comprising a resin film, a prepreg, a laminate or a printed circuit board.

The resin composition disclosed herein may comprise the prepolymer and the additive, wherein the additive may comprise polyphenylene oxide, cyanate ester, maleimide resin, polyolefin, acrylate, styrene, t-butyl styrene, divinylbenzene, bis(vinylbenzyl) ether, bis(vinylphenyl) ethane, triallyl isocyanurate, triallyl cyanurate, 1,2,4-trivinyl cyclohexane or a combination thereof. In addition, unless otherwise specified, the aforesaid polyphenylene oxide, cyanate ester, maleimide resin, polyolefin, acrylate, styrene, t-butyl styrene, divinylbenzene, bis(vinylbenzyl) ether, bis(vinylphenyl) ethane, triallyl isocyanurate, triallyl cyanurate, and 1,2,4-trivinyl cyclohexane shall be construed as including the modifications thereof.

Additives suitable for the resin composition disclosed herein are described briefly below.

Polyphenylene oxide may comprise vinyl-containing polyphenylene oxide, but not limited thereto. For example, unless otherwise specified, the polyphenylene oxide used in the present disclosure is not particularly limited and may be any commercial product, synthesized product by the Applicant or a combination thereof. Examples of the polyphenylene oxide include: vinylbenzyl-terminated polyphenylene oxide resin (e.g., OPE-2st available from Mitsubishi Gas Chemical Co., Inc.), methacrylate-terminated polyphenylene oxide resin (e.g., SA-9000 available from SABIC), vinylbenzyl-modified bisphenol A polyphenylene oxide resin, vinyl-containing chain-extended polyphenylene oxide resin or a combination thereof. A preferred polyphenylene oxide is the vinyl-containing polyphenylene oxide. For example, the chain-extended vinyl-containing polyphenylene oxide may include various polyphenylene oxide resins disclosed in the US Patent Application Publication No. 2016/0185904 A1, all of which are incorporated herein by reference in their entirety. For example, the chain-extended polyphenylene oxide may comprise a chain-extended methacrylate-terminated polyphenylene oxide resin or a chain-extended vinyl-terminated polyphenylene oxide resin.

The cyanate ester may include any one or more cyanate ester monomers, polymers or a combination thereof used for preparing a resin film, a prepreg, a laminate or a printed circuit board, such as a compound having an Ar—O—C≡N structure, wherein Ar may be a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin or fluorene cyanate ester resin. The novolac cyanate ester resin may be bisphenol A novolac cyanate ester resin, bisphenol F novolac cyanate ester resin, phenol novolac cyanate ester resin or a combination thereof. For example, the cyanate ester resin may be available under the tradename Primaset PT-15, PT-305, PT-605, BA-200, BA-230S, BA-30005, BTP-2500, BTP-60205, DT-4000, DT-7000, ULL-9505, HTL-300, CE-320, LVT-50 or LeCy sold by Lonza.

A maleimide resin may include a compound, a mixture or a combination thereof and may contain a monomer, a polymer or a combination thereof which comprises at least one maleimide group. Unless otherwise specified, the maleimide resin used in the present disclosure is not particularly limited and may include any one or more maleimide resins or a combination thereof used for preparing a resin film, a prepreg, a laminate or a printed circuit board. Examples include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, maleimide resin containing aliphatic long chain structures, a prepolymer thereof or a combination thereof. The aforesaid prepolymer of a maleimide resin may for example be a prepolymer of diallyl compound and maleimide resin, a prepolymer of diamine compound and maleimide resin, a prepolymer of multi-functional amine compound and maleimide resin or a prepolymer of acid phenol compound and maleimide resin.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Co., Ltd., or products such as BMI-70 and BMI-80 available from K.I Chemical Industry Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 sold by Designer Molecules Inc.

Examples of polyolefin include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, hydrogenated styrene-butadiene-divinylbenzene copolymer, polybutadiene (homopolymer of butadiene), maleic anhydride-butadiene copolymer, methyl styrene copolymer or a combination thereof. In some embodiments, the present disclosure uses the styrene-butadiene-divinylbenzene copolymer available from Cray Valley, e.g., Ricon 257. In some embodiments, the amount of the polyolefin, relative to 100 parts by weight of the prepolymerized resin, may be 5-50 parts by weight, preferably 5-40 parts by weight, and more preferably 10-30 parts by weight.

The acrylate may include, but not limited to, tricyclodecane di(meth)acrylate (e.g., SR833S, available from Sartomer), tri(meth)acrylate, 1,1'-[(octahydro-4,7-methano-1H-indene-5,6-diyl)bis(methylene)]ester or a combination thereof.

The resin composition disclosed above may further optionally comprise epoxy resin, phenoxy resin, benzoxazine resin, styrene maleic anhydride, acrylic resin, polyester, amine curing agent, diallyl bisphenol A, polyamide, polyimide or a combination thereof. Unless otherwise specified, the aforesaid additive may be any one or more epoxy resin, phenoxy resin, benzoxazine resin, styrene maleic anhydride, acrylic resin, polyester, amine curing agent, diallyl bisphenol A, polyamide and polyimide which is/are suitable for preparing a resin film, a prepreg, a laminate or a printed circuit board.

The resin composition disclosed above may further optionally comprise flame retardant, inorganic filler, curing accelerator, solvent, molecular weight regulator, polymerization inhibitor, toughening agent, coupling agent or a combination thereof.

The flame retardant disclosed above may be any one or more flame retardants used for preparing a resin film, a prepreg, a laminate or a printed circuit board; examples include but are not limited to phosphorus-containing flame retardant, preferably including ammonium polyphosphate, hydroquinone bis(diphenyl phosphate), bisphenol A bis(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, 9,10-dihydro-9-oxa-10-phosphaphenanthrene-10-oxide (DOPO) and its derivatives or resins, diphenylphosphine oxide (DPPO) and its derivatives or resins, melamine cyanurate, tris(2-hydroxyethyl) isocyanurate, aluminium phosphinate (e.g., commercially available OP-930 and OP-935), or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) and DOPO-BPSN (DOPO-bisphenol S novolac). In some embodiments, the present disclosure uses the di-DOPO phosphorus-containing high melting point (above 200° C., Di-DOPO) flame retardant, which may be synthesized by reference to Chinese Patent Application Publication CN105936745A.

For example, relative to a total of 100 parts by weight of the prepolymer and the additive, the amount of flame retardant used in the present disclosure is not particularly limited, and may range from 1 to 100 parts by weight, such as 10 to 90 parts by weight, 20 to 80 parts by weight, 30 to 70 parts by weight, or 40 to 60 parts by weight.

The inorganic filler may be any one or more inorganic fillers used for preparing a resin film, a prepreg, a laminate or a printed circuit board; examples of inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (A100H), calcined talc, talc, silicon nitride, calcined kaolin or a combination thereof. Moreover, the inorganic filler can be spherical, fibrous, plate-like, particulate, sheet-like, whisker-like or a combination thereof in shape and can be optionally pretreated by a silane coupling agent. In some embodiments, the present disclosure uses the spherical silica (e.g., SC-2500 SVJ) available from Admatechs.

The curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator encompasses curing initiator such as a peroxide capable of producing free radicals, and examples of the curing initiator may comprise but not limited to: benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, di(t-butylperoxy) isophthalate, t-butyl peroxybenzoate, 2,2-di(t-butylperoxy) butane, 2,2-di(t-butylperoxy)octane, 2,5-dimethyl-2,5-di (benzoylperoxy)hexane, lauroyl peroxide, t-hexyl peroxypivalate, dibutylperoxyisopropylbenzene, bis(4-t-butylcyclohexyl) peroxydicarbonate or a combination thereof. The amount of the curing accelerator, relative to 100 parts by weight of the prepolymerized resin, may be 0.01-5 parts by weight, preferably 0.1-2 parts by weight.

The purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

The purpose of adding toughening agent is to improve the toughness of the resin composition. The toughening agent may comprise, but not limited to, rubber resin, carboxyl-terminated butadiene acrylonitrile rubber (CTBN rubber), core-shell rubber, or a combination thereof.

The coupling agent includes, but not limited to, a silane coupling agent, which may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

The names of chemicals used in the examples and comparative examples are as follows.

H1: bis(vinylphenyl) ethane, BVPE, monomer content 99.8%, content of para-para vinyl groups 99.0%, available from Linchuan Chemical Co., Ltd.

H2: bis(vinylphenyl) ethane, BVPE, monomer content 92.3%, content of para-para vinyl groups 90.5%, available from Linchuan Chemical Co., Ltd.

H3: bis(vinylphenyl) ethane, BVPE, monomer content 80.1%, content of para-para vinyl groups 80.3%, available from Linchuan Chemical Co., Ltd.

H4: bis(vinylphenyl) ethane, BVPE, monomer content 73.5%, content of para-para vinyl groups 95.7%, available from Linchuan Chemical Co., Ltd.

H5: bis(vinylphenyl) ethane, BVPE, monomer content 90.5%, content of para-para vinyl groups 66.7%, available from Linchuan Chemical Co., Ltd.

H6: bis(vinylphenyl) ethane, BVPE, monomer content 71.9%, content of para-para vinyl groups 65.8%, available from Linchuan Chemical Co., Ltd.

H7: bis(vinylphenyl) hexane, BVPH, monomer content 95.5%, content of para-para vinyl groups 94.3%, available from Linchuan Chemical Co., Ltd.

H8: bis(vinylphenyl) dimethylbenzene, monomer content 96.7%, content of para-para vinyl groups 94.7%, available from Linchuan Chemical Co., Ltd.

H9: bis(vinylphenyl) dimethyl ether, monomer content 96.1%, content of para-para vinyl groups 93.9%, available from Linchuan Chemical Co., Ltd.

H10: bis(vinylphenyl) diethylbenzene, monomer content 96.5%, content of para-para vinyl groups 94.1%, available from Linchuan Chemical Co., Ltd.

H11: t-butyl styrene, TBS, available from Tokyo Chemical Industry Co., Ltd.

H12: triallyl isocyanurate, TAIC, available from Kingyorker Enterprise Co., Ltd.

H13: triallyl cyanurate, TAC, available from Kingyorker Enterprise Co., Ltd.

H14: divinylbenzene, DVB, available from Sigma Aldrich.

H15: methacrylate-terminated polyphenylene oxide resin, SA-9000, available from SABIC.

H16: styrene-butadiene-divinylbenzene terpolymer, Ricon 257, available from Cray Valley.

H17: di-DOPO phosphorus-containing high melting point (above 200° C.) flame retardant, Di-DOPO, as shown below, synthesized by reference to Chinese Patent Application Publication CN105936745A.

H18: spherical silica, SC-2500 SVJ, available from Admatechs.

H19: 2,5-dimethyl-2,5-di(t-butylperoxy)-3-hexyne, 25B, available from NOF Corporation.

H20: solvent mixture of toluene and methyl ethyl ketone, which are from commercially available source.

Preparation Example 1 of Prepolymer (for Each Preparation Example, the Solid Content of the Ingredients is 100%)

15 parts by weight of t-butyl styrene (TBS, H11) and a proper amount of toluene were added to a stirred reaction tank, and then 0.25 part by weight of dicumyl peroxide was fully dissolved in toluene and added to the stirred reaction tank, followed by continuously stirring the reaction at 85° C. for 1-2.5 hours. The reaction tank was protected with inert gas during the reaction. After 1-2.5 hours, the temperature of the reaction tank was lowered to 62-80° C. 35 parts by weight of bis(vinylphenyl) ethane (BVPE, H1) and 0.2 part by weight of 2,4-diphenyl-4-methyl-1-pentene were fully dissolved in toluene and added to the reaction tank via a constant pressure funnel; during the addition process, which was finished within 0.5-1 hour, the temperature was kept at 80° C. and the reaction was stirred continuously. After 1-2.5 hours of reaction at 62-80° C. with stirring, the temperature of the reaction tank was lowered to 45-60° C., and a proper amount of 4-methoxyphenol was added; the reaction was further stirred for 0.5-1.5 hours, then the temperature was lowered to room temperature, and the solution obtained was purified to obtain a product, Prepolymer A, which is a prepolymer of the present disclosure.

Figure 1:
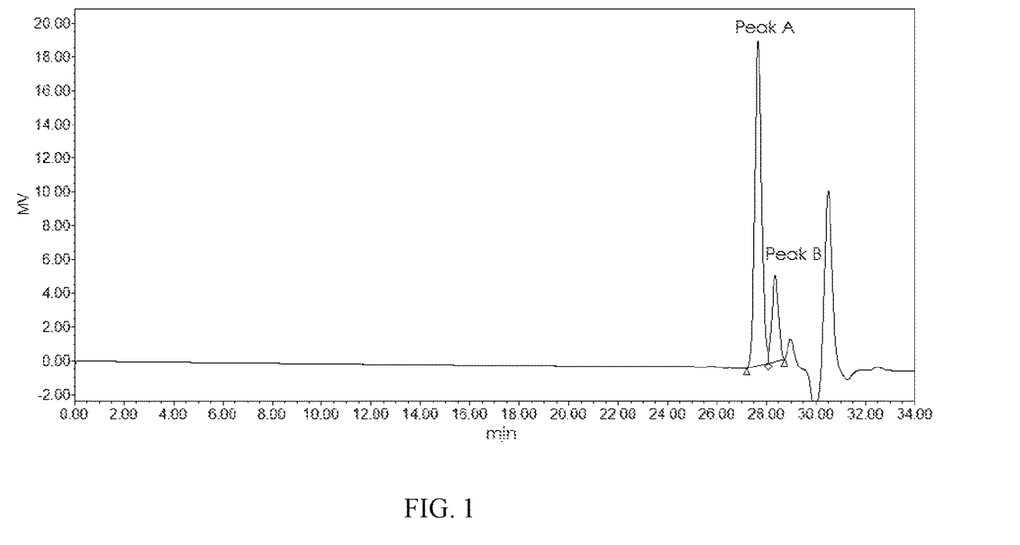
FIG. 1 illustrates the GPC spectrum of raw materials before prepolymerization in Preparation Example 1.

Gel permeation chromatography (GPC) was used to analyze the resin material before prepolymerization, as shown in FIG. 1, wherein Peak A is the GPC peak of the reactant bis(vinylphenyl) ethane, and Peak B is the GPC peak of t-butyl styrene, wherein a polystyrene sample was used as the reference of weight average molecular weight. The resin material before prepolymerization refers to a solution containing 35 parts by weight of bis(vinylphenyl) ethane, 15 parts by weight of t-butyl styrene and a proper amount of toluene which were added to the stirred reaction tank and fully dissolved. From FIG. 1, it can be observed that Peak A corresponds to a weight average molecular weight (Mw) of 222 Dalton and an integral area of 375708; and Peak B corresponds to a weight average molecular weight (Mw) of 161 Dalton and an integral area of 95230.

Figure 2:
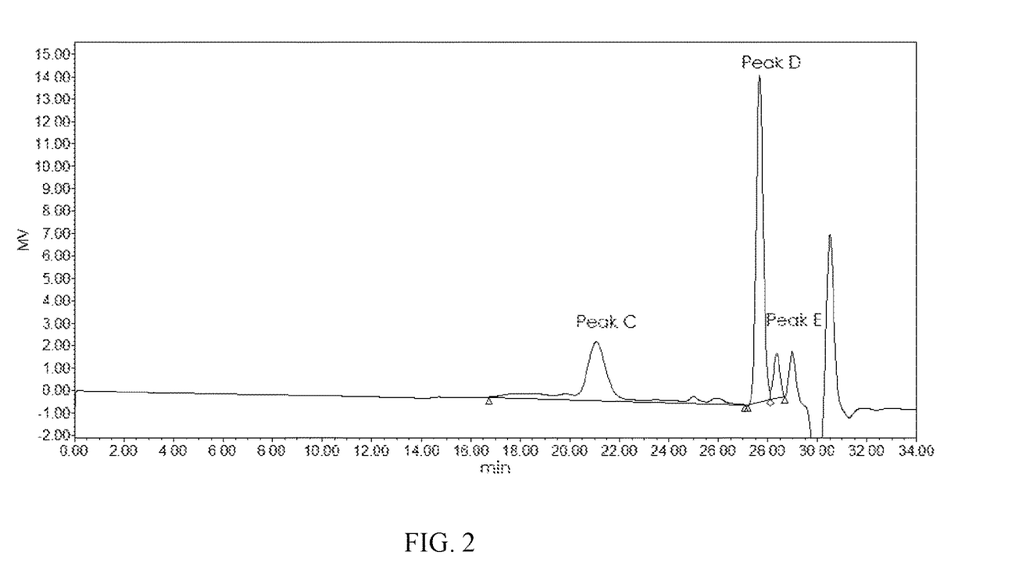
FIG. 2 illustrates the GPC spectrum of prepolymer A obtained in Preparation Example 1 after prepolymerization.

The GPC analysis result of the prepolymerized resin (i.e., the prepolymer, which is the product of the prepolymerization reaction) is shown in FIG. 2, wherein Peak C is the GPC peak of the prepolymer (Mw of 9230 Dalton, integral area of 200023), and Peak D is the GPC peak of the residual unreacted bis(vinylphenyl) ethane remaining after the prepolymerization reaction (Mw of 222 Dalton, integral area of 236952). The conversion rate of the bis(vinylphenyl) ethane calculated from the peak area is about 37%. Peak E is the GPC peak of the residual unreacted t-butyl styrene remaining after the prepolymerization reaction (Mw of 161 Dalton, integral area of 36259). Calculation of the peak area indicates that the conversion rate is about 62%. It means that, in Preparation Example 1, the bis(vinylphenyl) compound and the unsaturated bond-containing compound were partially reacted to form the Prepolymer A of the present disclosure.

Figure 3:
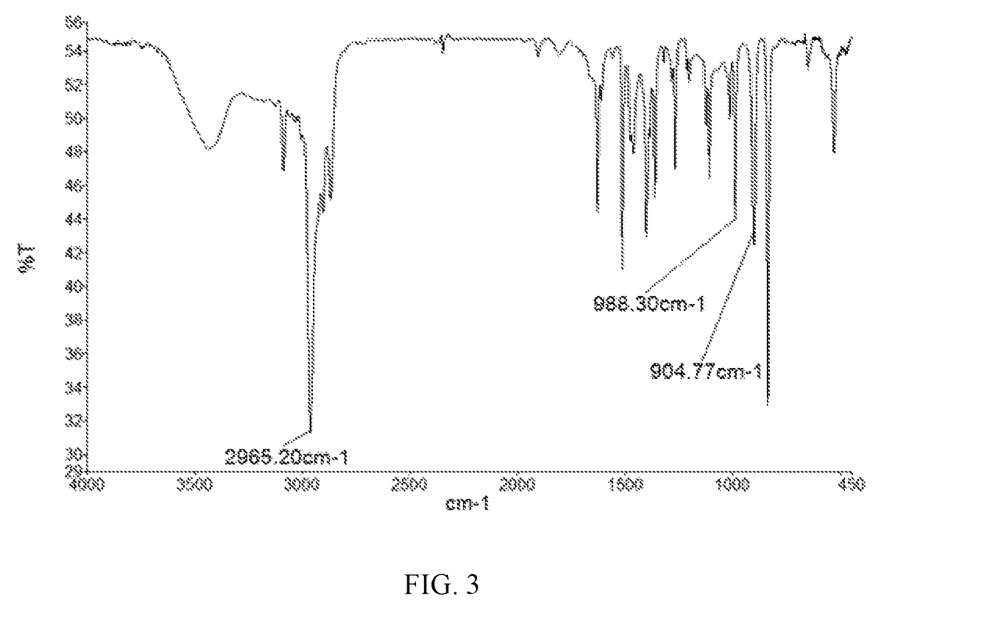
FIG. 3 illustrates the FTIR spectrum of raw material t-butyl styrene before prepolymerization in Preparation Example 1.
Figure 4:
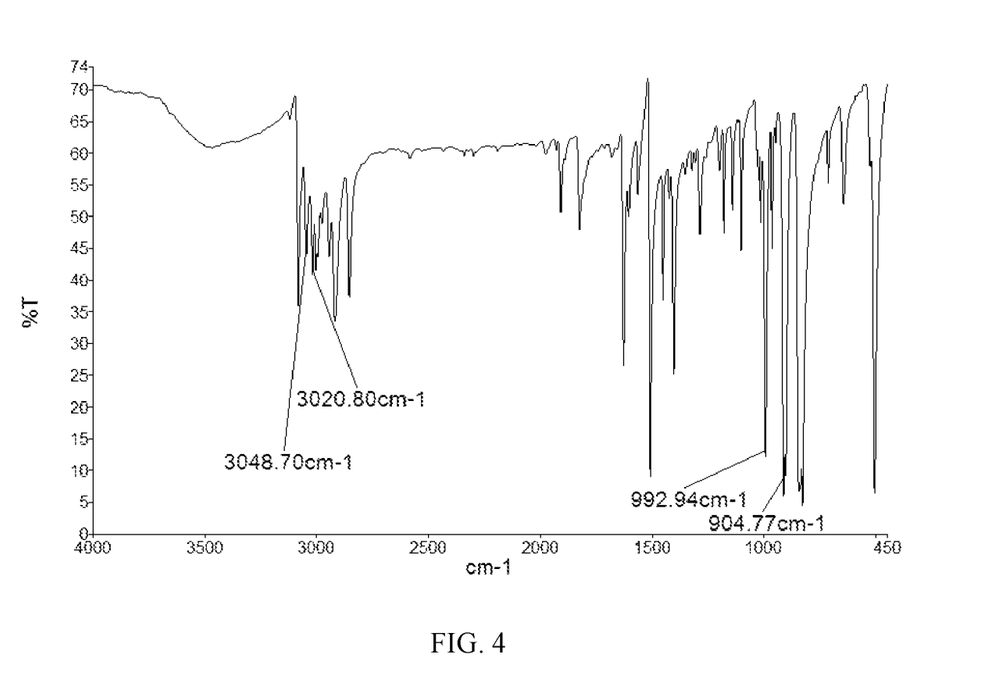
FIG. 4 illustrates the FTIR spectrum of raw material bis(vinylphenyl) ethane before prepolymerization in Preparation Example 1.
Figure 5:
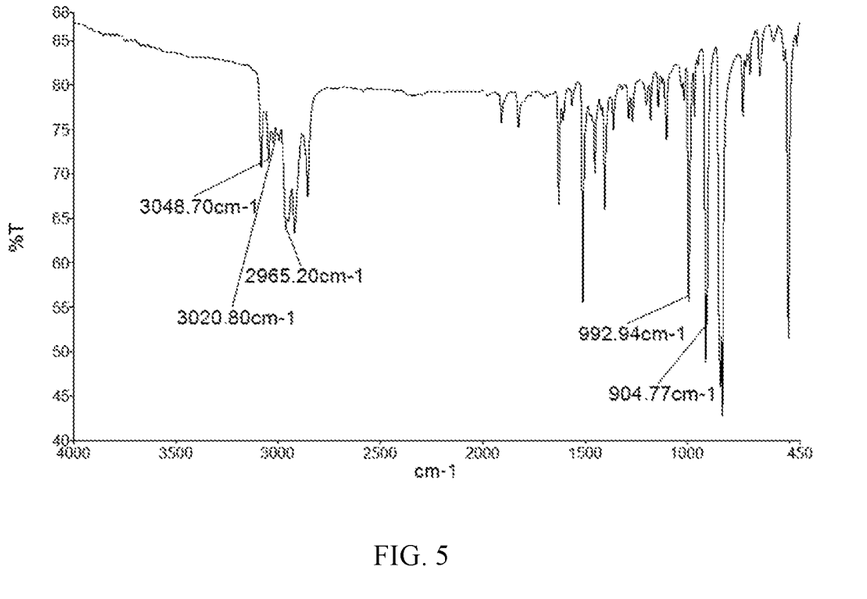
FIG. 5 illustrates the FTIR spectrum of prepolymer A obtained in Preparation Example 1 after prepolymerization.

FTIR was used to analyze the resin material before prepolymerization and the prepolymerized product. FIG. 3 illustrates the FTIR spectrum of t-butyl styrene before prepolymerization, wherein 2965.20 $cm^{-1}$ represents the characteristic peak of methyl group on t-butyl styrene, and 988.30 $cm^{-1}$ and 904.77 $cm^{-1}$ represent the characteristic peaks of C═C double bond on t-butyl styrene; FIG. 4 illustrates the FTIR spectrum of bis(vinylphenyl) ethane before prepolymerization, wherein 3048.70 $cm^{-1}$ and 3020.80 $cm^{-1}$ represent the characteristic peaks of methylene group between the two benzene rings of bis(vinylphenyl) ethane, and 992.94 $cm^{-1}$ and 904.77 $cm^{-1}$ represent the characteristic peaks of double bond on bis(vinylphenyl) ethane. FIG. 5 is the FTIR spectrum of the Prepolymer A, wherein the characteristic peak of the unique methyl group of t-butyl styrene appears at 2965.20 $cm^{-1}$, and the characteristic peaks of the unique methylene group of bis(vinylphenyl) ethane appear at 3048.70 $cm^{-1}$ and 3020.80 $cm^{-1}$. The presence of the characteristic peaks of C═C double bond at 992.94 $cm^{-1}$ and 904.77 $cm^{-1}$ indicates that the prepolymer contains reactive vinyl groups.

Prepolymer Preparation Example 2

15 parts by weight of t-butyl styrene (TBS, H11) and a proper amount of toluene were added to a stirred reaction tank, and then 0.25 part by weight of dicumyl peroxide was fully dissolved in toluene and added to the stirred reaction tank, followed by continuously stirring the reaction at 85° C. for 1-2.5 hours. The reaction tank was protected with inert gas during the reaction. After 1-2.5 hours, the temperature of the reaction tank was lowered to 62-80° C. 35 parts by weight of bis(vinylphenyl) ethane (BVPE, H2) and 0.2 part by weight of 2,4-diphenyl-4-methyl-1-pentene were fully dissolved in toluene and added to the reaction tank via a constant pressure funnel; during the addition process, which was finished within 0.5-1 hour, the temperature was kept at 80° C. and the reaction was stirred continuously. After 1-2.5 hours of reaction at 62-80° C. with stirring, the temperature of the reaction tank was lowered to 45-60° C., and a proper amount of 4-methoxyphenol was added; the reaction was further stirred for 0.5-1.5 hours, then the temperature was lowered to room temperature, and the solution obtained was purified to obtain a product, Prepolymer B, which is a prepolymer of the present disclosure.

Preparation Examples of Other Prepolymers

Prepolymers of other Examples and Comparative Examples were prepared by reference to the processes and conditions described in Preparation Example 1 and Preparation Example 2, including Prepolymer C (resin composition Example E3, prepolymerized by 15 parts by weight of H11 and 35 parts by weight of H3); Prepolymer D (Example E4, prepolymerized by 15 parts by weight of H11 and 35 parts by weight of H7); Prepolymer E (Example E5, prepolymerized by 15 parts by weight of H11 and 35 parts by weight of H8); Prepolymer F (Example E6, prepolymerized by 15 parts by weight of H11 and 35 parts by weight of H9); Prepolymer G (Example E7, prepolymerized by 15 parts by weight of H11 and 35 parts by weight of H10); Prepolymer H (Example E8, prepolymerized by 15 parts by weight of H11, 10 parts by weight of H7 and 25 parts by weight of H1); Prepolymer I (Example E9, prepolymerized by 15 parts by weight of H12 and 35 parts by weight of H1); Prepolymer J (Example E10, prepolymerized by 15 parts by weight of H13 and 35 parts by weight of H1); Prepolymer K (Example E11, prepolymerized by 10 parts by weight of H11, 5 parts by weight of H12 and 35 parts by weight of H1); Prepolymer L (Example E12, prepolymerized by 5 parts by weight of H11, 5 parts by weight of H12, 5 parts by weight of H14 and 35 parts by weight of H1); Prepolymer M (Example E13, prepolymerized by 4 parts by weight of H11, 4 parts by weight of H12, 4 parts by weight of H13, 3 parts by weight of H14 and 35 parts by weight of H1); Prepolymer N (Example E14, prepolymerized by 15 parts by weight of H11, 25 parts by weight of H15 and 35 parts by weight of H2); Prepolymer O (Example E15, prepolymerized by 40 parts by weight of H11 and 10 parts by weight of H1); Prepolymer P (Example E16, prepolymerized by 10 parts by weight of H11 and 50 parts by weight of H1); Prepolymer Q (Examples E17 and E18, prepolymerized by 15 parts by weight of H11 and 35 parts by weight of H1); Prepolymer R (Comparative Example C1, prepolymerized by 15 parts by weight of H11 and 35 parts by weight of H6); Prepolymer S (Comparative Example C2, prepolymerized by 15 parts by weight of H11 and 35 parts by weight of H5); Prepolymer T (Comparative Example C3, prepolymerized by 15 parts by weight of H11 and 35 parts by weight of H4); Prepolymer U (Comparative Example C7, homopolymerized by 35 parts by weight of H1); Prepolymer V (Comparative Examples C8 and C9, homopolymerized by 15 parts by weight of H11); Prepolymer W (Example E19, prepolymerized by 45 parts by weight of H11 and 5 parts by weight of H1); and Prepolymer X (Example E20, prepolymerized by 10 parts by weight of H11 and 55 parts by weight of H1.

Example E1 of Resin Composition (for Example E1, the Solid Content of the Ingredients is 100%)

In Prepolymer A, 50 parts by weight of methacrylate-terminated polyphenylene oxide resin (H15), 20 parts by weight of Ricon 257 (H16) and a proper amount of the solvent mixture (H20) containing toluene and methyl ethyl ketone were added and mixed and stirred to fully dissolve the solid ingredients to form a homogeneous liquid state. Then 50 parts by weight of di-DOPO phosphorus-containing high melting point flame retardant (H17) and 60 parts by weight of SC-2500 SVJ (H18) were added. The solution was fully stirred and then added with 0.5 part by weight of 2,5-dimethyl-2,5-di(t-butylperoxy)-3-hexyne (H19) pre-dissolved in methyl ethyl ketone and then stirred for 0.5 hour to obtain the Resin Composition E1.

Examples and Comparative Examples of Other Resin Compositions (the solid content of the ingredients of each Example and Comparative Example is 100%)

According to the ingredients and amounts listed in Table 1 to Table 2 below, resin composition Examples E2 to E20 containing the prepolymer of the present disclosure were prepared. In addition, according to the ingredients and amounts listed in Table 3 to Table 4 below, resin composition Comparative Examples C1 to C15 not containing the prepolymer of the present disclosure were prepared.

Next, resin compositions from different Examples (E1 to E20) and Comparative Examples (C1 to C15) were respectively added to a stirred tank, well mixed and fully dissolved as varnishes and then added to an impregnation tank. A fiberglass fabric (e.g., 2116 or 1080 L-glass fiber fabric) was immersed into the impregnation tank to adhere the resin composition on the fiberglass fabric, followed by heating at 120° C. to 170° C. to the semi-cured state (B-Stage) to obtain the prepreg.

Samples were prepared according to the descriptions below and tested by reference to the following conditions.

1. Copper-Clad Laminate (Obtained by Laminating Five Prepregs)

Two 18 μm hyper very low profile (HVLP) copper foils and five prepregs made from each resin composition (using 2116 L-glass fiber fabrics) were prepared. Each prepreg has a resin content of about 55%. A copper foil, five prepregs and a copper foil were superimposed in such order and then subject to a vacuum condition for lamination at 200° C. for 2.5 hours to form each copper-clad laminate. Insulation layers were formed by curing (C-stage) five sheets of superimposed prepreg between the two copper foils, and the resin content of the insulation layers is about 55%.

2. Copper-Free Laminate (Obtained by Laminating Five Prepregs)

Each copper-clad laminate was etched to remove the two copper foils to obtain a copper-free laminate made from laminating five prepregs and having a resin content of about 55%.

3. Copper-Free Laminate (Obtained by Laminating Two Prepregs)

Two 18 μm hyper very low profile (HVLP) copper foils and two prepregs made from each resin composition (using 1080 L-glass fiber fabrics) were prepared. Each prepreg has a resin content of about 70%. A copper foil, two prepregs and a copper foil were superimposed in such order and then subject to a vacuum condition for lamination at 205° C. for 2 hours to form each copper-clad laminate. Next, each copper-clad laminate was etched to remove the two copper foils to obtain a copper-free laminate made from laminating two prepregs and having a resin content of about 70%.

Test items and test methods are described below.

1. Varnish Shelf Life

A varnish was prepared from the resin composition of each Example and Comparative Example according to Table 1 to Table 4; the varnish was well mixed and fully dissolved and stood still at 5-35° C. and observed to measure the duration before precipitation, turbidity or layer separation appears. If precipitation, turbidity or layer separation appears after standing the varnish for more than 1 day and less than or equal to 15 days, a designation of ">1" is recorded. If precipitation, turbidity or layer separation appears within 1 day, a designation of "<1" is recorded. In Comparative Example C7, gelation of the prepolymerized product was observed such that a laminate sample could not be made and tested.

2. Prepreg Stickiness Resistance (PP Stickiness Resistance)

Prepregs obtained from 2116 L-glass fiber fabrics impregnated with each Example or Comparative Example were prepared, a plurality of prepregs from the same Example or Comparative Example were vacuum-packed by an aluminium foil bag and placed at 35° C. for 48 hours, and then the prepregs were removed for inspection to determine whether surface stickiness occurs between adjacent prepregs. If stickiness was not observed, a designation of "OK" is given; if stickiness was observed, a designation of "NG" is given.

3. Glass Transition Temperature (Tg)

The copper-free laminate (obtained by laminating five prepregs) was subject to glass transition temperature measurement. The glass transition temperature (in ° C.) of each specimen was measured using a dynamic mechanical analysis (DMA) method by reference to IPC-TM-650 2.4.24.4. In the present technical field, higher glass transition temperature is better.

4. Ratio of Thermal Expansion (or Ratio of Dimensional Change, Z-Axis)

The copper-free laminate (obtained by laminating five prepregs) was subject to thermal mechanical analysis (TMA) during the ratio of thermal expansion measurement. Each specimen was heated from 35° C. to 300° C. at a heating rate of 10° C./minute and then subject to the measurement of ratio of thermal expansion (%) in Z-axis by reference to the method described in IPC-TM-650 2.4.24.5. In the present technical field, lower ratio of thermal expansion is more preferred, and a difference in ratio of thermal expansion of greater than or equal to 0.1% represents significant difference.

5. Peeling Strength to Copper Foil (P/S)

The copper-clad laminate (obtained by laminating five prepregs) was cut into a rectangular sample with a width of 24 mm and a length of greater than 60 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the force (1b/in) required to separate the copper foil from the insulation layer of the laminate. In the present technical field, under a 10 GHz frequency, for a copper-clad laminate with a dissipation factor of less than 0.004, a difference in peeling strength of greater than 0.1 lb/in represents a significant difference.

6. Thermal Resistance after Moisture Absorption (Pressure Cooking Test, PCT)

The copper-free laminate (obtained by laminating five prepregs) was subject to pressure cooking test by reference to IPC-TM-650 2.6.16.1 and 5 hours of moisture absorption (test temperature 121° C., relative humidity 100%), and then by reference to IPC-TM-650 2.4.23, the copper-free laminate after moisture absorption was immersed into a 288° C. solder bath for 20 seconds, and removed and inspected for the presence of delamination. Three specimens were tested for each Example and Comparative Example, in which "0" represents no occurrence of delamination (no occurrence of delamination represents pass), and "X" represents occurrence of delamination (occurrence of delamination represents fail). For the three PCT tests, designation with one "X" represents that delamination occurs in one specimen, designition with two "X" represents that delamination occurs in two specimens, and designation with three "X" represents that delamination occurs in all three specimens. For example, inter-layer separation between insulation layers is considered as delamination. Interlayer delamination or blistering may occur between any layers of the laminate.

7. Dielectric Constant (Dk) and Dissipation Factor (Df)

The copper-free laminate (obtained by laminating two prepregs) was subject to dielectric constant and dissipation factor measurement. Each specimen was measured by using a microwave dielectrometer (available from AET Corp.) by reference to JIS C2565 at room temperature (about 25° C.) and under 10 GHz frequency. Lower dielectric constant and lower dissipation factor represent better dielectric properties of the specimen. Under a 10 GHz frequency, for a Dk value of less than 3.50 and a Df value of less than 0.004, a difference in Dk value of greater than 0.01 represents substantial difference (i.e., significant technical difficulty) in dielectric constant in different laminates, a difference in Dk value of less than 0.01 represents no substantial difference in dielectric constant in different laminates, a Df value of less than 0.0001 represents no substantial difference in dissipation factor in different laminates, and a difference in Df value of greater than 0.0001 represents a significant difference (i.e., significant technical difficulty) in dissipation factor in different laminates.

8. Laminate Appearance

By visual inspection with naked eyes, if the laminate made from the resin composition has a non-defective appearance, then a designation of "OK" is given.

TABLE 1

Resin compositions (in part by weight) and test results

| Component | | E1 | E2 | E3 | E4 | E5 | E6 | E7 | E8 | E9 | E10 |
|---|---|---|---|---|---|---|---|---|---|---|---|
| prepolymer | A | 50 | | | | | | | | | |
| | B | | 50 | | | | | | | | |
| | C | | | 50 | | | | | | | |
| | D | | | | 50 | | | | | | |
| | E | | | | | 50 | | | | | |
| | F | | | | | | 50 | | | | |
| | G | | | | | | | 50 | | | |
| | H | | | | | | | | 50 | | |
| | I | | | | | | | | | 50 | |
| | J | | | | | | | | | | 50 |
| polyphenylene oxide | H15 | 50 | 50 | 50 | 50 | 50 | 50 | 50 | 50 | 50 | 50 |
| toughening agent | H16 | 20 | 20 | 20 | 20 | 20 | 20 | 20 | 20 | 20 | 20 |
| flame retardant | H17 | 50 | 50 | 50 | 50 | 50 | 50 | 50 | 50 | 50 | 50 |
| inorganic filler | H18 | 60 | 60 | 60 | 60 | 60 | 60 | 60 | 60 | 60 | 60 |
| peroxide | H19 | 0.5 | 0.5 | 0.5 | 0.5 | 0.5 | 0.5 | 0.5 | 0.5 | 0.5 | 0.5 |
| solvent | H20 | PA | PA | PA | PA | PA | PA | PA | PA | PA | PA |

| Item | | E1 | E2 | E3 | E4 | E5 | E6 | E7 | E8 | E9 | E10 |
|---|---|---|---|---|---|---|---|---|---|---|---|
| Varnish shelf life | | >1 | >1 | >1 | >1 | >1 | >1 | >1 | >1 | >1 | >1 |
| PP stickiness resistance | | OK | OK | OK | OK | OK | OK | OK | OK | OK | OK |
| DMA-Tg | | 227 | 226 | 222 | 220 | 221 | 220 | 220 | 226 | 222 | 220 |
| Ratio of thermal expansion | | 2.4 | 2.4 | 2.5 | 2.5 | 2.4 | 2.6 | 2.5 | 2.4 | 2.4 | 2.5 |
| P/S | | 3.6 | 3.6 | 3.5 | 3.3 | 3.7 | 3.6 | 3.6 | 3.5 | 3.8 | 3.6 |
| PCT | | OOO | OOO | OOO | OOO | OOO | OOO | OOO | OOO | OOO | OOO |
| Dk | | 3.05 | 3.10 | 3.10 | 3.07 | 3.05 | 3.10 | 3.07 | 3.06 | 3.10 | 3.10 |
| Df | | 0.0017 | 0.0018 | 0.0020 | 0.0019 | 0.0018 | 0.0020 | 0.0019 | 0.0018 | 0.0019 | 0.0018 |
| Laminate appearance | | OK | OK | OK | OK | OK | OK | OK | OK | OK | OK |

Note:
"PA" represents a proper amount; "*" indicates serious resin flow; and "**" indicates partial dry board.

TABLE 2

Resin compositions (in part by weight) and test results

| Component | | E11 | E12 | E13 | E14 | E15 | E16 | E17 | E18 | E19 | E20 |
|---|---|---|---|---|---|---|---|---|---|---|---|
| prepolymer | K | 50 | | | | | | | | | |
| | L | | 50 | | | | | | | | |
| | M | | | 50 | | | | | | | |
| | N | | | | 75 | | | | | | |
| | O | | | | | 50 | | | | | |
| | P | | | | | | 60 | | | | |
| | Q | | | | | | | | 50 | 50 | |
| | W | | | | | | | | | | 50 |
| | X | | | | | | | | | | 65 |
| polyphenylene oxide | H15 | 50 | 50 | 50 | 25 | 50 | 50 | 80 | 30 | 50 | 50 |

TABLE 2-continued

| | | | | | | | | | | |
|---|---|---|---|---|---|---|---|---|---|---|
| toughening agent | H16 | 20 | 20 | 20 | 20 | 20 | 20 | 40 | 5 | 20 | 20 |
| flame retardant | H17 | 50 | 50 | 50 | 50 | 50 | 50 | 60 | 40 | 50 | 50 |
| inorganic filler | H18 | 60 | 60 | 60 | 60 | 60 | 60 | 85 | 45 | 60 | 60 |
| peroxide | H19 | 0.5 | 0.5 | 0.5 | 0.5 | 0.5 | 0.5 | 0.5 | 0.5 | 0.5 | 0.5 |
| solvent | H20 | PA | PA | PA | PA | PA | PA | PA | PA | PA | PA |

| Item | E11 | E12 | E13 | E14 | E15 | E16 | E17 | E18 | E19 | E20 |
|---|---|---|---|---|---|---|---|---|---|---|
| Varnish shelf life | >1 | >1 | >1 | >1 | >1 | >1 | >1 | >1 | >1 | >1 |
| PP stickiness resistance | OK | OK | OK | OK | OK | OK | OK | OK | OK | OK |
| DMA-Tg | 223 | 225 | 223 | 221 | 220 | 232 | 220 | 230 | 216 | 234 |
| Ratio of thermal expansion | 2.4 | 2.3 | 2.5 | 2.4 | 2.7 | 2.3 | 2.7 | 2.4 | 2.7 | 2.3 |
| P/S | 3.6 | 3.7 | 3.7 | 3.7 | 3.0 | 3.7 | 3.3 | 3.3 | 3.0 | 3.7 |
| PCT | OOO | OOO | OOO | OOO | OOO | OOO | OOO | OOO | OOO | OOO |
| Dk | 3.10 | 3.10 | 3.10 | 3.10 | 3.05 | 3.10 | 3.10 | 3.10 | 3.05 | 3.10 |
| Df | 0.0018 | 0.0017 | 0.0018 | 0.0018 | 0.0020 | 0.0017 | 0.0020 | 0.0017 | 0.0020 | 0.0017 |
| Laminate appearance | OK | OK | OK | OK | OK | OK | OK | OK | * | ** |

Note:
"PA" represents a proper amount; "*" indicates serious resin flow; and "**" indicates partial dry board.

TABLE 3

Resin compositions (in part by weight) and test results

| Component | | C1 | C2 | C3 | C4 | C5 | C6 | C7 |
|---|---|---|---|---|---|---|---|---|
| prepolymer | R | 50 | | | | | | |
| | S | | 50 | | | | | |
| | T | | | 50 | | | | |
| | U | | | | | | | 35 |
| | V | | | | | | | |
| bis(vinylphenyl) compound | H1 | | | | | | 35 | |
| | H2 | | | | | 35 | | |
| | H3 | | | | 35 | | | |
| | H7 | | | | | | | |
| | H8 | | | | | | | |
| | H9 | | | | | | | |
| | H10 | | | | | | | |
| unsaturated bond-containing compound | H11 | | | | 15 | 15 | 15 | |
| | H12 | | | | | | | |
| | H13 | | | | | | | |
| | H14 | | | | | | | |
| polyphenylene oxide | H15 | 50 | 50 | 50 | 50 | 50 | 50 | 50 |
| toughening agent | H16 | 20 | 20 | 20 | 20 | 20 | 20 | 20 |
| flame retardant | H17 | 50 | 50 | 50 | 50 | 50 | 50 | 50 |
| inorganic filler | H18 | 60 | 60 | 60 | 60 | 60 | 60 | 60 |
| peroxide | H19 | 0.5 | 0.5 | 0.5 | 0.5 | 0.5 | 0.5 | 0.5 |
| solvent | H20 | PA | PA | PA | PA | PA | PA | PA |

| Item | C1 | C2 | C3 | C4 | C5 | C6 | C7 |
|---|---|---|---|---|---|---|---|
| Varnish shelf life | >1 | >1 | >1 | <1 | <1 | <1 | gelation |
| PP stickiness resistance | OK | OK | OK | NG | NG | NG | |
| DMA-Tg | 208 | 218 | 210 | 215 | 219 | 220 | |
| Ratio of thermal expansion | 2.8 | 2.5 | 2.8 | 2.6 | 2.4 | 2.4 | |
| P/S | 2.9 | 3.4 | 3.2 | 2.9 | 3.2 | 3.2 | |
| PCT | OOX | OOO | OOX | OXX | OOX | OOX | |
| Dk | 3.25 | 3.25 | 3.12 | 3.15 | 3.15 | 3.10 | |
| Df | 0.0023 | 0.0023 | 0.0021 | 0.0021 | 0.0021 | 0.0019 | |
| Laminate appearance | OK | OK | OK | OK | OK | OK | |

TABLE 4

Resin compositions (in part by weight) and test results

| Component | | C8 | C9 | C10 | C11 | C12 | C13 | C14 | C15 |
|---|---|---|---|---|---|---|---|---|---|
| prepolymer | R | | | | | | | | |
| | S | | | | | | | | |
| | T | | | | | | | | |

TABLE 4-continued

| | | C8 | C9 | C10 | C11 | C12 | C13 | C14 | C15 |
|---|---|---|---|---|---|---|---|---|---|
| | U | | | | | | | | |
| | V | 15 | 15 | | | | | | |
| bis(vinylphenyl) | H1 | | | 25 | 35 | 35 | 35 | 35 | 35 |
| compound | H2 | 35 | | | | | | | |
| | H3 | | | | | | | | |
| | H7 | | | 10 | | | | | |
| | H8 | | | | | | | | |
| | H9 | | | | | | | | |
| | H10 | | | | | | | | |
| unsaturated | H11 | | | 15 | | | 10 | 5 | 4 |
| bond-containing | H12 | | | | 15 | | 5 | 5 | 4 |
| compound | H13 | | | | | 15 | | | 4 |
| | H14 | | | | | | | 5 | 3 |
| polyphenylene oxide | H15 | 50 | 50 | 50 | 50 | 50 | 50 | 50 | 50 |
| toughening agent | H16 | 20 | 20 | 20 | 20 | 20 | 20 | 20 | 20 |
| flame retardant | H17 | 50 | 50 | 50 | 50 | 50 | 50 | 50 | 50 |
| inorganic filler | H18 | 60 | 60 | 60 | 60 | 60 | 60 | 60 | 60 |
| peroxide | H19 | 0.5 | 0.5 | 0.5 | 0.5 | 0.5 | 0.5 | 0.5 | 0.5 |
| solvent | H20 | PA | PA | PA | PA | PA | PA | PA | PA |

| Item | C8 | C9 | C10 | C11 | C12 | C13 | C14 | C15 |
|---|---|---|---|---|---|---|---|---|
| Varnish shelf life | <1 | >1 | <1 | <1 | <1 | <1 | <1 | <1 |
| PP stickiness resistance | OK | OK | NG | NG | NG | NG | NG | NG |
| DMA-Tg | 218 | 200 | 218 | 220 | 217 | 219 | 220 | 218 |
| Ratio of thermal expansion | 2.6 | 3.1 | 2.5 | 2.4 | 2.5 | 2.4 | 2.3 | 2.5 |
| P/S | 2.5 | 1.9 | 3.2 | 3.3 | 3.2 | 3.4 | 3.3 | 3.3 |
| PCT | XXX | XXX | OOX | OOX | OOX | OOX | OXX | OXX |
| Dk | 3.15 | 3.40 | 3.10 | 3.10 | 3.10 | 3.10 | 3.10 | 3.10 |
| Df | 0.0021 | 0.0025 | 0.0020 | 0.0020 | 0.0020 | 0.0019 | 0.0019 | 0.0020 |
| Laminate appearance | OK | OK | OK | OK | OK | OK | OK | OK |

The following observations can be made from Table 1 to Table 4.

Comparisons between Examples E1-E20 and Comparative Examples C4-C6 and C10-C15, it is observed that if the bis(vinylphenyl) compound has a prespecified monomer content and para-para vinyl content, after the prepolymerization reaction with the unsaturated bond-containing compound, the varnish shelf life can be prolonged and the stickiness resistance and thermal resistance after moisture absorption can be improved, in contrast with compositions without prepolymerization.

Comparisons between Examples E1-E7 and Comparative Examples C1-C3, it is observed that by limiting the content of para-para vinyl groups of the bis(vinylphenyl) compound to 80%-99% and limiting the monomer content of the bis(vinylphenyl) compound to 80%-100%, the prepolymer thus obtained, when being used in a composition, can achieve better dielectric properties and better thermal resistance.

Comparisons between Examples E1-E20 and Comparative Examples C7-C9, it is observed that by prepolymerization of bis(vinylphenyl) compounds and unsaturated bond-containing compounds of different structures, in contrast to homopolymerization of the same bis(vinylphenyl) compound (Comparative Example C7) or homopolymerization of the same unsaturated bond-containing compound (Comparative Examples C8 and C9), the prepolymer thus obtained, when being used in a composition, can achieve better dielectric properties and better thermal resistance after moisture absorption.

The above detailed description is merely illustrative in nature and is not intended to limit the embodiments of the subject matter or the application and uses of such embodiments. As used herein, the term "exemplary" or "example" means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

The invention claimed is:

1. A prepolymer prepared by subjecting an unsaturated bond-containing compound and a bis(vinylphenyl) compound to a prepolymerization reaction, wherein the bis(vinylphenyl) compound comprises a bis(vinylphenyl) compound monomer of Formula (I) or a combination of the bis(vinylphenyl) compound monomer of Formula (I) and a polymer thereof,

Formula (I)

wherein R represents any one of Formula (II) to Formula (IV):

Formula (II)

-continued

Formula (III)

$-(-CH_2)_{\overline{n6}}-O-(-CH_2)_{\overline{n6}})_{\overline{n7}}$

Formula (IV)

wherein n1 represents an integer of 2 or 6, n2 represents an integer of 0 or 1, n3, n4, n5, n6 and n7 individually represent an integer of 1, the bis(vinylphenyl) compound contains between 80% and 99% of para-para vinyl groups and has a monomer content of between 80% and 100%, and wherein the unsaturated bond-containing compound comprises t-butyl styrene, triallyl isocyanurate, triallyl cyanurate, divinylbenzene, unsaturated bond-containing polyphenylene oxide, maleimide resin or a combination thereof.

2. The prepolymer of claim 1, wherein the prepolymerization reaction is performed in the presence of a peroxide.

3. The prepolymer of claim 2, wherein the peroxide comprises benzoyl peroxide, dicumyl peroxide, 2,5-dimethyl-2,5-di(t-butylperoxy)hexane, 2,5-dimethyl-2,5-di(t-butylperoxy)-3-hexyne, di-t-butyl peroxide, di(t-butylperoxyisopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis(4-t-butylcyclohexyl) peroxydicarbonate or a combination thereof.

4. The prepolymer of claim 1, wherein the prepolymerization reaction is performed in the presence of a molecular weight regulator.

5. The prepolymer of claim 4, wherein the molecular weight regulator comprises n-butyl mercaptan, dodecyl mercaptan, mercaptoacetic acid, mercaptopropanoic acid, mercaptoethanol, 2,4-diphenyl-4-methyl-1-pentene or a combination thereof.

6. The prepolymer of claim 1, wherein the prepolymerization reaction is performed in the presence of a polymerization inhibitor.

7. The prepolymer of claim 6, wherein the polymerization inhibitor comprises hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis (4-ethyl-6-t-butylphenol) or a combination thereof.

8. The prepolymer of claim 1, wherein the polymerization reaction has a conversion rate of between 10% and 90%.

9. The prepolymer of claim 1, which contains a reactive vinyl group.

10. The prepolymer of claim 1, which has a weight average molecular weight of between 1000 and 200000.

11. A resin composition comprising the prepolymer of claim 1 and an additive.

12. The resin composition of claim 11, comprising 1 to 300 parts by weight of the additive relative to 100 parts by weight of the prepolymer.

13. The resin composition of claim 11, wherein the additive comprises polyphenylene oxide, cyanate ester, maleimide resin, polyolefin, acrylate, styrene, t-butyl styrene, divinylbenzene, bis(vinylbenzyl) ether, bis(vinylphenyl) ethane, triallyl isocyanurate, triallyl cyanurate, 1,2,4-trivinyl cyclohexane or a combination thereof.

14. The resin composition of claim 11, further comprising epoxy resin, phenoxy resin, benzoxazine resin, styrene maleic anhydride, acrylic resin, polyester, amine curing agent, diallyl bisphenol A, polyamide, polyimide or a combination thereof.

15. The resin composition of claim 11, further comprising flame retardant, inorganic filler, curing accelerator, solvent, molecular weight regulator, polymerization inhibitor, toughening agent, coupling agent or a combination thereof.

16. The resin composition of claim 11, wherein a varnish made from the resin composition has a shelf life of greater than or equal to 1 day.

17. A method of preparing the prepolymer of claim 1, comprising subjecting the unsaturated bond-containing compound and the bis(vinylphenyl) compound to the prepolymerization reaction.

18. The method of claim 17, further comprising adding a peroxide, a molecular weight regulator, a polymerization inhibitor or a combination thereof.

19. An article made from the resin composition of claim 11, wherein the article is a resin film, a prepreg, a laminate or a printed circuit board.

20. The article of claim 19, wherein the article is the laminate, wherein the laminate has a glass transition temperature as measured by using a dynamic mechanical analyzer by reference to IPC-TM-650 2.4.24.4 of greater than or equal to 216° C.

21. The article of claim 19, wherein the article is the laminate, wherein the laminate has a Z-axis ratio of thermal expansion as measured by using a thermomechanical analyzer by reference to IPC-TM-650 2.4.24.5 of less than or equal to 2.70%.

22. The article of claim 19, wherein the article is the laminate, wherein the laminate has a copper foil peeling strength as measured by using a tensile strength tester by reference to IPC-TM-650 2.4.8 of greater than or equal to 3.0 lb/in.

23. The article of claim 19, wherein the article is the laminate, wherein no delamination occurs after moisture absorption of 5 hours as measured by reference to IPC-TM-650 2.6.16.1 and then subject to a solder dip test by reference to IPC-TM-650 2.4.23.

24. The article of claim 19, wherein the article is the laminate, wherein the laminate has at least one of the following properties:
 a dissipation factor as measured by reference to JIS C2565 of less than or equal to 0.0020; and
 a dielectric constant as measured by reference to JIS C2565 of less than or equal to 3.10.

* * * * *